Dec. 21, 1965
J. C. HASTINGS
3,224,256
SYSTEM TO RETAIN AND INDICATE MAXIMUM READING
OF A STRAIN GAGE TYPE INDICATOR
Filed May 7, 1962
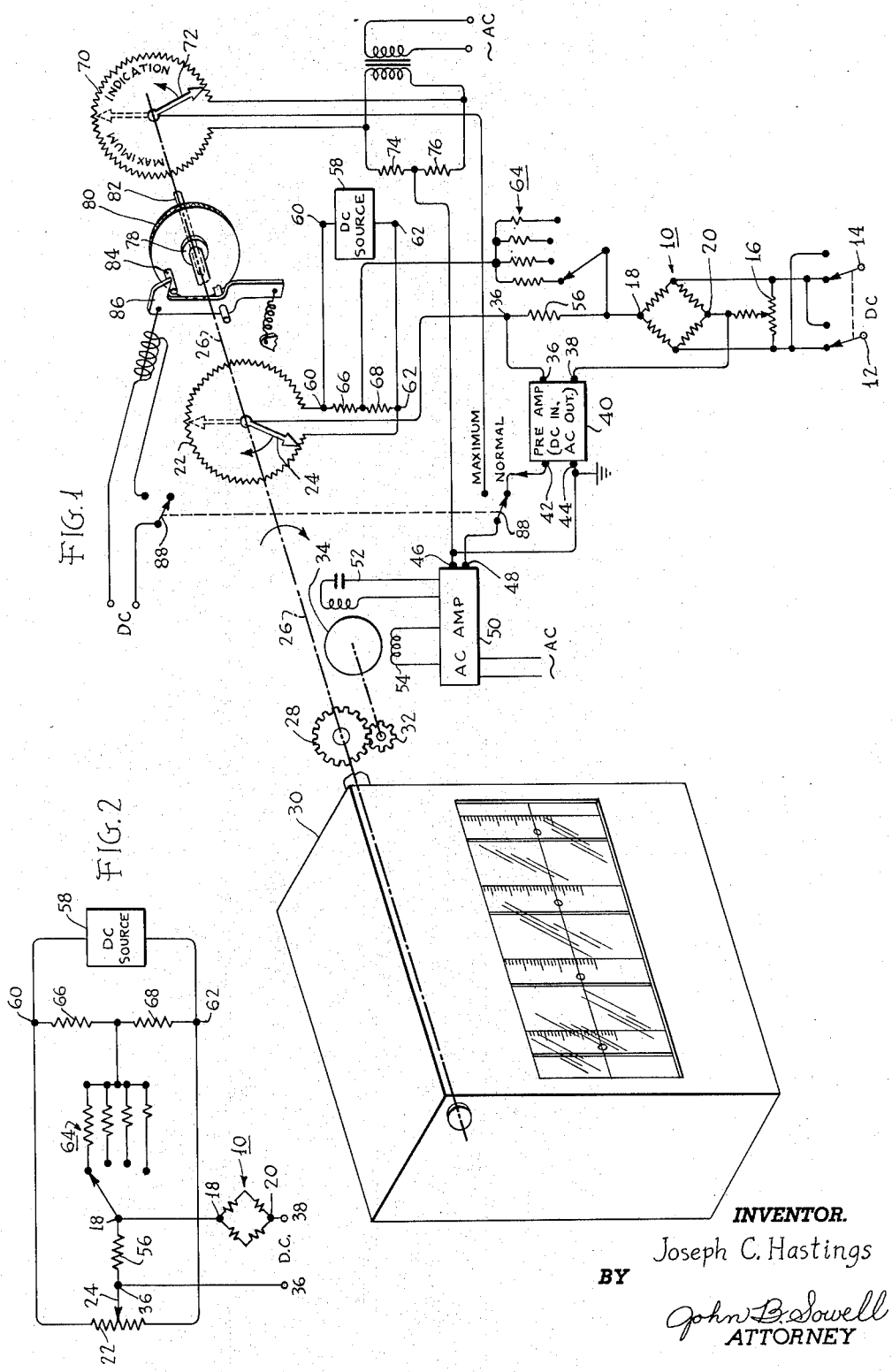
INVENTOR.
Joseph C. Hastings
BY John B. Sowell
ATTORNEY

United States Patent Office 3,224,256
Patented Dec. 21, 1965

3,224,256
SYSTEM TO RETAIN AND INDICATE MAXI-
MUM READING OF A STRAIN GAGE TYPE
INDICATOR
Joseph C. Hastings, Wayne, Pa., assignor, by mesne assignments, to Tinius Olsen Testing Machine Co., Willow Grove, Pa., a corporation of Pennsylvania
Filed May 7, 1962, Ser. No. 192,753
4 Claims. (Cl. 73—88.5)

This invention relates to a multi-range load indicator for testing machines having strain gage test cell load devices and more particularly to a system for retaining a maximum load imposed on a load device.

Strain gage test cells are well known in the testing art and have been employed in electrical circuitry to position servo motors indicative of the load imposed on the test cells. Servo motor systems have been employed in electrical indicating circuitry to produce a precise rotation of a mechanical shaft.

Heretofore, the most advanced testing machine electrical circuitry associated with servo motor systems for positioning a rotating shaft has employed the principle of matching the voltage output from a previously set potentiometer or similar device against the voltage output of a calibrated scale coupled to a potentiometer or similar device. It was found that such devices have proved unsatisfactory because a servo motor by its nature must overshoot the desired shaft position and then return in transient fashion to seek a precise location. It was also found that the non-linearity of both potentiometers causes appreciable errors. The applicant has discovered a means of setting a maximum load indication on a potentiometer and positioning a servo motor shaft driven indicating device to a precise shaft rotation position indicative of the maximum load set in the potentiometer without the necessity of matching one potentiometer against another. The means further permits the servo motor to overshoot and seek a zero position in transient fashion to determine the precise zero position of the maximum load indicating potentiometer.

A primary object of the present invention is to provide a simple and precise means for indicating the maximum load to which a strain gage test cell has been subjected;

Another object of the present invention is to provide an improved maximum load indicating device;

Another object of the present invention is to provide an improved electrical circuit for connecting a maximum load indicating potentiometer into the electrical circuitry for normal load indicating means.

The above and other objects will be apparent from the following description of an exemplary embodiment, reference being made to the accompanying drawings, wherein:

FIG. 1 is a diagrammatic view of the apparatus and circuitry for both normal and maximum load indications; and FIG. 2 is a detail of the output circuitry associated with the normal load indicating potentiometer.

A bridge circuit 10 comprising four strain gages is shown coupled to a source of direct current (D.C.) at terminals 12 and 14. Between the D.C. source and the bridge circuit is a compensating circuit 16 which permits the setting of the voltage output at terminals 18 and 20 of the strain gage bridge to be adjusted to zero voltage, indicative of a no-load condition on the bridge circuit. Assuming that no-load is yet applied to the bridge circuit, the normal range indicating potentiometer 22 will have its wiper arm 24 located at the lower end of the range scale, as shown. Wiper arm 24 is connected by a shaft 26 to a spur gear 28 and a multi-range indicating device 30.

A pinion 32 of the servo motor 34 drives gear 28 and shaft 26, and in turn positions both the wiper arm 24 and the multi-range indicating device 30. Whenever the bridge circuit 10 is unbalanced by a stress condition indicative of either tension or compression the bridge output at terminals 18 and 20 is increased causing a signal or change in voltage output to be sensed at terminals 36 and 38 at the input of the preamplifier 40 which converts the D.C. signal to an A.C. output at terminals 42 and 44. The output of preamplifier 40 is applied to the input terminals 46 and 48 of the servo motor amplifier 50. Servo motor amplifier 50 is of standard A.C. construction having electrical connections to a standard field 52 and a variable field 54 90 degrees out of phase with the standard field of the servo motor 34. A signal applied to the servo motor amplifier 50 will cause rotation of the servo motor 34, pinion 32, gear 28, shaft 26 and the wiper arm 24 of the normal range indicating potentiometer 22 so that the voltage output sensed at the wiper arm 24 tends to compensate for the voltage output of the bridge circuit causing the indicated voltage applied to the terminals 36 and 38 to reach a null or balance condition. Thus, a balance condition is reached when the voltage across resistor 56 is equal and opposite to the voltage output of the bridge 10.

Referring now to FIG. 2 showing the electrical circuitry for the normal range indicating potentiometer 22. A change in the voltage output of the bridge circuit occurs first, causing an increase at terminal 18 and also at terminal 36 causing the servo motor 34 to move the wiper arm 24 of the potentiometer 22 upward as shown in FIG. 2. Assuming that the D.C. source 58 maintains a constant voltage output, further that terminal 60 is the high voltage terminal, and terminal 62 is the low voltage terminal, then raising the wiper arm 24 also causes an increase in voltage at terminal 36. When the voltage at terminal 36 exactly equals the voltage at terminal 18 there is no voltage output at terminals 36 and 38 thus terminating the positioning operation of the servo motor 34 causing the wiper arm 24 connected to the shaft 26 to be precisely located at a position indicative of the output of the strain gage bridge circuit 10. It will be noted that the current flow through resistor 56 causes a voltage drop which is used to balance the voltage output of the bridge 10. A range selector 64 is provided in the series circuit with resistor 56 to enable various voltage outputs across the resistor 56. For any particular setting of the wiper arm 24 a lesser value of resistance inserted at 64 causes a greater voltage drop across resistance 56 or alternatively a greater voltage output across the terminals 36 and 18. Thus, it can be seen that for a given voltage output across terminals 18 and 20 a greater or lesser value of shaft 26 rotation may be affected to balance the circuit depending upon the value of the range selector 64 inserted in series with the series resistor 56. Resistor 66 is ordinarily selected to have a resistance value approximately equal to potentiometer 22. The resistance value of resistor 68 is ordinarily selected to be a very small increment of the resistor 66 to enable the wiper arm 24 of potentiometer 22 to be set in a normal position slightly above the reference voltage of the low voltage terminal 62.

When a specimen is tested the bridge circuit and the test cell are unbalanced and the voltage output at terminal 18 causes shaft 26 to be turned clockwise by the servo motor 34. When the specimen under test ruptures the load on the bridge in the test cell is relieved causing the servo motor to return the shaft 26, wiper arm 24, and indicator 30 back to the normal or zero indicating position.

In order to provide a means for retaining the maximum load reached before the specimen is ruptured a maximum indicating potentiometer 70 is provided. Potentiometer 70 has its wiper arm 72 shown in its normal zero output position, and like potentiometer 22 is not at an end position, but is biased to the zero indicated output by the voltage divider comprising resistors 74 and 76. When the specimen under test is being strained it causes shaft 26 to rotate clockwise as shown in FIG. 1. Shaft 26 is coupled to a friction slip clutch 78 which drives knurled wheel 80 and shaft 82 by friction means. A pin 84 on knurled wheel 80 prevents clockwise rotation by engagement with spring biased latch 86. It can be seen that the latch 86 prevents rotation of shaft 82 by shaft 26 so long as the rotational movement of shaft 26 is in the clockwise direction. Once shaft 26 has been driven to its maximum output position and the specimen under test ruptures shaft 26 is moved in a counterclockwise rotational movement back to its normal (zero load) position. Pin 84 is free to move in a counterclockwise direction and friction clutch 78 drives knurled wheel 80, shaft 82, and wiper arm 72 in a counterclockwise direction after the specimen is ruptured and the system is returned to its normal or zero indicated output, thus positioning wiper arm 72 the angular amount that shaft 26 was driven in the clockwise direction. In order to determine the maximum indicated output it is only necessary to determine the degree of rotation of shaft 82. A double pole switch 88 is provided for making effective the maximum indicating potentiometer. One pole of the switch 88 effectively removes the latch 86 from interfering with the pin 84 and the second pole of the switch couples the ouput of the potentiometer 70 to the amplifier 50. As already explained the two fields 52 and 54 of the servo motor 34 will position shaft 26 so that the voltage input to the amplifier 50 at terminal 48 is effectively reduced to zero. The maximum indicating potentiometer 70 having been rotated counterclockwise, following specimen rupture, by shaft 26 and friction clutch 78 creates a voltage output sensed at the wiper arm 72 of potentiometer 70. As already explained an increase in voltage output sensed at the amplifier 50 causes shaft 26 to rotate clockwise. Clockwise rotation of shaft 26 drives indicator 30 up scale and at the same time through friction clutch 78 drives shaft 82 and wiper arm 72 clockwise to effectively reduce the voltage output at wiper arm 72 thus reducing the voltage output being fed to terminal 48 of amplifier 50. Clockwise rotation of shaft 26 continues until wiper arm 72 reaches its normal or zero position. When the voltage output to the amplifier 50 is reduced to zero by transient seeking the rotation of shaft 26 by servo motor 34 ceases. It will be noted that the exact amount of rotation imparted to shaft 82 by the counterclockwise rotation of shaft 26 is necessary to return shaft 82 and wiper arm 72 in a clockwise rotation to the normal position. It will be noted that the wiper arm of potentiometer 70 reaches a zero output before it reaches the end range of the potentiometer 70 thus providing the necessary overshoot for the servo motor 34 which will home or zero in a transient fashion, thus, eliminating any possibility that the setting imparted to the maximum indicating potentiometer is changed before the maximum indicated load can be observed from the multi-range indicating device 30.

After the maximum load is observed, as explained above, the switch 88 may be returned to its normal load indicating position from the maximum load indicating position. When this occurs the voltage signal from potentiometer 22 is connected through terminal 36 to the servo motor 34. If there is no voltage signal from the strain gage bridge 10, the servo motor returns the indicating device 30 back to its normal zero indicating position. When the servo motor returns the indicating device back to its normal zero position wiper arm 24 is moved counterclockwise from its dotted position to its normal zero position and wiper arm 72 is returned counterclockwise from its normal zero position to its dotted position. Only when wiper arm 24 reaches its normal zero position is the voltage signal applied to terminal 36 again reduced to zero causing a null or balance of the servo motor. Thus, the changing of the position of switch 88 returns shaft 26 to its normal zero position but shaft 82 is still positioned counterclockwise from its normal zero position. The maximum indicating potentiometer and shaft 82 may be returned to its normal or zero indicated position by manually turning the knurled wheel 80 back to its rest position against the latch 86 while the servo motor 34 and the associated pinion and gear 32 and 28 effectively hold shaft 26 in its zero indicated output position.

It is seen that the invention provides an improved precision means for repeating maximum indicated load conditions which does not depend upon the linearity of the potentiometer or the inherent transient response of the servo motor. While one embodiment of the invention has been specifically illustrated and described it is understood that other output indicating devices may be employed and other input indicating means may be associated therewith and modifications of the novel return to zero maximum indicating potentiometer devices may be made within the general scope of the present invention.

What is claimed:

1. In an electro-mechanical system for reindicating the maximum load applied to a test specimen of the type having an electrical strain transducer electrically connected to a servo motor which is adapted to mechanically drive both a visual indicating device and a balance potentiometer so that the balance potentiometer creates a zero voltage balance at the servo motor when the visual indicating device indicates the load applied to the test specimen, the combination comprising, shaft means connected to said visual indicating device and driven by said servo motor, friction drive means having an input shaft connected to said shaft means and an output shaft friction-coupled to said input shaft, stop means for restraining the rotational movement of said output shaft when a load is applied to said test specimen which causes said servo motor to drive said visual indicating device to a position indicative of the applied load, a maximum load indicating potentiometer having a movable arm mechanically connected to said output shaft and electrically connectable to said servo motor, said potentiometer having a stationary resistance element electrically connected to a voltage source to provide a voltage output proportional to the rotational position of said movable arm, said means for restraining the movement of said output shaft being adapted to maintain the rotational position of said movable arm in a zero balance position when a load is being applied to a test specimen, which provides a zero voltage balance voltage output on said movable arm, said means for restraining the movement of said output shaft being adapted to permit rotational movement of said movable arm when a load is being removed from a test specimen which provides a voltage output on said movable arm at a voltage output position, and switch means for electrically disconnecting said electrical strain transducer and said balance potentiometer from said servo motor after a load has been applied to and subsequently removed from a test specimen, which caused the movable arm of said maximum load indicating potentiometer to be positioned at a voltage output position, said switch means being operable to electrically connect the voltage output at said movable arm to said servo motor whereby said servo motor is caused to simultaneously drive said movable arm and said visual indicating device until the movable arm provides a zero voltage balance output at said servo motor and the visual indicating device reindicates the maximum load which has been applied to and removed from said test specimen.

2. In an electro-mechanical system as set forth in claim 1, wherein said stop means for restraining the rotational movement of said output shaft comprises a latch engageable with a pin connected to said output shaft.

3. Electro-mechanical system as set forth in claim 2, wherein said switch means further includes a solenoid relay for disengaging said latch from operable engagement with said pin, simultaneously operable with said switch means when said switch means electrically connect the voltage output at said movable arm to said servo motor.

4. In an electro-mechanical system as set forth in claim 1, wherein said maximum load indicating potentiometer has its movable arm set in a zero balance position intermediate the ends of the stationary resistance element and further includes a voltage divider connected in the voltage supply circuit to provide an adjustable zero bias at said wiper arm whereby said wiper arm under operable conditions may seek in transient fashion the zero balance position without overrunning the end connections of said stationary resistance element.

References Cited by the Examiner

UNITED STATES PATENTS

| | | | |
|---|---|---|---|
| 2,808,721 | 10/1957 | Strimel | 73—88.5 |
| 2,812,229 | 11/1957 | Strimel | 73—88.5 X |
| 2,883,617 | 4/1959 | Lathrop | 73—88.5 X |
| 3,146,618 | 9/1964 | MacGeorge et al. | 73—88.5 |

RICHARD C. QUEISSER, *Primary Examiner.*

JOSEPH P. STRIZAK, *Examiner.*